United States Patent Office 3,510,257
Patented May 5, 1970

3,510,257
PROCESS OF SEPARATING RUBIDIUM FROM ALKALI METAL IMPURITIES
Marshal C. Farquhar and John A. Hill, Trona, Calif., assignors to American Potash & Chemical Corporation, Los Angeles, Calif., a corporation of Delaware
No Drawing. Continuation-in-part of application Ser. No. 604,573, Dec. 27, 1966. This application Dec. 19, 1968, Ser. No. 785,330
Int. Cl. C01d 11/04; C01g 1/08
U.S. Cl. 23—89                                    11 Claims

ABSTRACT OF THE DISCLOSURE

A process for separating rubidium values from a mixture of rubidium and at least one impurity selected from the group consisting of lithium, sodium, potassium and cesium which comprises converting said mixture to a solution in which the rubidium and said impurity are present as salts selected from the group consisting of nitrates and chlorides, and concentrating said salt solution to precipitate crystals comprising a rubidium salt separate from the major portion of said impurity which remains in said solution. A rubidium salt substantially free of alkali metal impurities may be produced in this manner.

---

This application is a continuation-in-part of copending application Ser. No. 604,573, filed Dec. 27, 1966 now abandoned.

BACKGROUND OF THE INVENTION

Field of the invention

This invention relates to the separation of rubidium values from a mixture of rubidium and at least one alkali metal impurity. More particularly, the invention relates to the separation of such alkali metal impurities from the rubidium in said mixtures and to the preparation of a rubidium salt of sufficient purity to serve as an analytical standard.

Description of the prior art

In most naturally occuring materials containing rubidium, the rubidium is usually found in association with one or more of the other alkali metals. A number of techniques have been suggested heretofore in order to separate lithium, sodium, potassium, cesium and other impurities commonly occurring with rubidium obtained from natural sources. According to one suggested technique, rubidium is separated from alakali metal impurities by first converting the rubidium to rubidium chloroiodide, $RbCl_2I$, and converting the rubidium chloroiodide to an acid tartrate, which is then recrystallized several times to remove cesium. According to another technique, cesium is separated from rubidium and rubidium from potassium by fractional precipitation using a stannic chloride solution. Another known process for removing potassium contaminants from rubidium salts involves the precipitation of the latter as iodides. However, none of the techniques suggested heretofore for the separation of rubidium from alkali metal contaminants has been completely satisfactory.

SUMMARY OF THE INVENTION

Rubidium values are separated from a mixture of rubidium and at least one impurity selected from the group consisting of lithium, sodium, potassium and cesium. Rubdium is separated from lithium, sodium and potassium impurities and from a portion of cesium impurity which may be contained in the mixture by converting the mixture to a nitrate solution in which the rubidium and the impurity are present as nitrates and concentrating the nitrate solution to precipitate crystals comprising rubidium nitrate separate from the major portion of the impurity which remains in solution.

Rubidium is separated from a mixture of rubidium and cesium by converting the mixture to a chloride solution in which the rubidium and cesium are present as chlorides and concentrating the chloride solution to precipitate crystals of rubidium chloride separate from the cesium which remains in solution.

A rubidium salt containing less than about 10 p.p.m. cesium impurity and less than about 20 p.p.m. total detectable metallic impurities may be obtained by the process of this invention.

DESCRIPTION OF THE PREFERRED EMBODIMENTS

In the practice of the present invention, an impure rubidium material, containing one or more alkali metal impurities, is converted by any suitable means to a solution in which the rubidium and the alkali metal impurities are present as nitrates. Generally, the impure rubidium material treated according to the present invention is an impure rubidium salt which may be obtained by the treatment of naturally occurring minerals such as lepidolite, pollucite, spodumene and the like. Such an impure salt usually contains varying amounts of at least one alkali metal impurity associated with the rubidium. A number of impure rubidium salts may be used in this invention but it is generally preferred to use a salt which is soluble in water, such as for example, rubidium carbonate, rubidium nitrate, rubidium sulfate, rubidium chloride, rubidium hydroxide and the like. Other rubidium salts which can be converted into a nitrate solution may, of course, also be used.

The method by which the impure rubidium material is converted into a nitrate solution will depend upon the nature of the impure rubidium-containing material. Generally, any suitable means for forming a nitrate solution (i.e., a solution in which the rubidium and the other alkali metals are present as nitrates) of the impure material may be used in this invention. For example, if the starting material is impure rubidium nitrate, the nitrate solution can be formed by dissolving the impure nitrate salt in water. Rubidium carbonate and chloride can be converted into a nitrate solution by acidification with nitric acid. Other rubidium salts such as sulfates, hydroxides and the like may be converted to nitrates by first converting the starting salt to rubidium carbonate by treatment with barium carbonate, oxalic acid or other suitable materials, and then forming the nitrate solution by acidification of the carbonate salt with nitric acid. A material such as roasted rubidium ferrocyanide may be used as the starting material and converted to a nitrate solution by leaching with water and neutralizing with nitric acid.

The nitrate solution thus formed is concentrated to precipitate crystals comprising rubidium nitrate separate from the major portion of the impurities which remain in solution. The nitrate solution may be concentrated by any suitable means such as by heating, by boiling either under reduced pressure or at atmospheric pressure or the like. The solution is concentrated to such an extent that rubidium nitrate crystallizes out of solution. According to a preferred embodiment, the nitrate solution is concentrated by boiling until crystals of rubidium nitrate begin to form in the boiling solution. The hot, concentrated solution is then cooled to precipitate the rubidium nitrate crystals from solution. The nitrate solution may be concentrated further, but such further concentration is generally not preferred since it results in increased liquor entrainment in the crystals and therefore reduces the amount of impurities separated from the rubidium. Concentration of the nitrate solution to the point of rubidium nitrate crystal formation therefore is preferred for upon cooling of the solution, a good yield of rubidium nitrate crystals is obtained.

The major portion of the lithium, sodium and potassium impurities and some of the cesium impurities which may be contained in the impure rubidium starting material remain in the nitrate solution and are thereby separated from the rubidium which crystallizes out. It has been found that up to about 70% of the potassium impurities, up to about 80% of the lithium and sodium impurities and considerable amounts of the cesium impurities remain in solution and are separated from the rubidium.

The rubidium nitrate crystals are recovered from the concentrated solution by any suitable means and may be recrystallized to remove additional amounts of impurities. Thus, the rubidium nitrate crystals may be contacted with water to form an aqueous nitrate solution thereof, and the aqueous solution concentrated according to the procedure described hereinabove to precipitate rubidium nitrate crystals from the aqueous solution. Such recrystallization steps may be repeated until substantially all of the lithium and sodium impurities and over 90% of the potassium impurities present in the impure starting material are separated from the rubidium nitrate.

In this manner, the rubidium is separated from lithium, sodium and potassium impurities and from a portion of cesium impurity which may be contained in the impure starting material. The rubidium may, if desired, be separated from the remainder of the cesium by any conventional rubidium-cesium separation technique, such as for example, by fractionally precipitating cesium as cesium antimony chloride, as disclosed in U.S. Patent No. 2,808,-313; by fractionally precipitating cesium as cesium chlorostannate, as disclosed in British Patent No. 872,5009; and the like. Preferably, the rubidium is separated from the cesium by the process described hereinbelow.

According to the present invention, rubidium is separated from a mixture of rubidium and cesium by converting the mixture to a chloride solution in which the rubidium and cesium are present as chlorides and concentrating the solution to precipitate crystals of rubidium chloride separate from the cesium which remains in solution.

In order to obtain rubidium values substantially free of alkali metal impurities, lithium, sodium and potassium impurities are separated from the rubidium-cesium mixture prior to converting the mixture to a chloride solution. Preferably such lithium, sodium and potassium impurities are separated by the procedure described above. However, other techniques for separating lithium, sodium and potassium from rubidium may be used to prepare the rubidium-cesium mixture. Thus, the remainder of the cesium impurities which were not separated from the rubidium during the recrystallizations from the nitrate solutions, as described above, may be separated from the rubidium by converting the rubidium nitrate to a chloride solution and precipitating rubidium chloride crystals therefrom.

The method by which the rubidum-cesium mixture is converted to a chloride solution will depend on the nature of the mixture. Generally, any suitable means for forming a chloride solution (i.e. a solution in which the rubidium and cesium are present as chlorides) of the mixture may be used. For example, if the mixture is rubidium nitrate which contains cesuim impurities, as obtained by the technique above, the chloride solution can be formed by heating the nitrate salt in hydrochloric acid. If the rubidium and cesium are present in the mixture as chlorides, the chloride solution can be formed by dissolving the mixture in water. Also, the rubidium and cesium in the mixture may, if desired, be converted into a carbonate salt such as by treatment with oxalic acid, and the carbonate converted into the chloride solution by heating in hydrochloric acid.

The chloride solution thus formed is concentrated to precipitate rubidium chloride crystals from the solution while the cesium remains in solution. The chloride solution may be concentrated in the same manner as the nitrate solution, as described above, and is concentrated to such an extent that on cooling rubidium chloride crystallizes out of solution. Preferably, the chloride solution is concentrated by boiling until crystals of rubidum chloride begin to form in the boiling solution. Upon cooling the hot concentrated solution, a good yield of rubidium chloride crystals is obtained, while most of the cesium impurities remain in solution and are thereby separated from the rubidium.

The rubidium chloride thus precipitated is separated from the concentrated solution, as by filtration, centrifugation, or the like and may be recrystallized to separate any remaining amount of cesium which may still be associated with the rubidium. Thus, the rubidium chloride crystals may be contacted with water to form an aqueous chloride solution thereof, and the aqueous solution concentrated, as described above, to precipitate purified rubidium chloride crystals. Such recrystallization steps may be repeated until substantially all of the cesium contained in the impure starting material is separated from the rubidium. The rubidium chloride thus obtained may, if desired, be converted into other rubidium salts of high purity.

It has been found that a substantially pure rubidium salt can be obtained from an impure rubidium material which contains one or more alkali metal impurities by the sequential treatment of such a material with the preferred separation procedures described above. Thus, a rubidium salt containing less than about 10 p.p.m. cesium and less than about 20 p.p.m. total detectable metallic impurities may be obtained by converting the impure rubidium material to a nitrate solution, concentrating the nitrate solution to precipitate crystals comprising rubidium nirate from the solution, converting the crystals thus obtained to a chloride solution and concentrating the chloride solution to precipitate substantially pure rubidium nitrate from solution. In this manner lithium, sodium and potassium impurities and a portion of cesium impurity which may be contained in the impure starting material remain in the nitrate solution to provide a rubidium salt, free of lithium, sodium and potassium contamination, which may contain some cesium impurity. The cesium remains in the chloride solution when rubidium is separated therefrom to thereby separate the rubidium from the cesium and provide a rubidium salt of high purity. Such a rubidium salt is of sufficient purity to be suitable for use as an analytical standard.

The following example is set forth to illustrate, not to limit, the invention, whereby those skilled in the art may understand more fully the manner in which the present invention may be carried into effect. In the instant specification and appended claims, all parts and percentages are by weight unless otherwise indicated.

EXAMPLE

The impure rubidium-containing starting material used in this example consisted of technical-grade rubidium carbonate. Flame photometric analysis for the minor alkalies indicated approximately 0.7% potassium, 0.5% cesium, 0.1% sodium and 0.1% lithium contained in the material. An aqueous solution containing 1834 parts by weight of the technical-grade rubidium carbonate was formed by dissolving the impure starting material in water, and the aqueous solution acidified with nitric acid to form a nitrate solution. The resulting solution was concentrated by boiling until crystals of rubidium nitrate began to form in the boiling solution. The concentrated solution was permitted to cool to precipitate a crop of rubidium nitrate crystals which was separated from the solution by filtration. Analysis of this product showed that 70% of the potassium and about 80% of the sodium and lithium contained in the impure starting material had been separated from the rubidium. This crop of rubidium nitrate crystals was dissolved in water and the process of concentration and crystallization was repeated several times to separate additional amounts of the alkali metal impurities from the rubidium. After the third recrystallization, 93% of the potassium and substantially all of the lithium and sodium contained in the starting material had been separated from the rubidium and no further separation of potassium appeared to occur between the fifth and sixth recrystallizations. Some cesium removal appeared to occur during the first crystallization; however, no further removal of cesium occurred during the subsequent nitrate recrystallizations. Approximately 77% of the rubidium originally present in the starting material was recovered as rubidium nitrate. This clearly shows that rubidium may be separated from lithium, sodium and potassium impurities and a portion of the cesium impurity contained in the impure rubidium starting material by the process of the present invention.

The rubidium nitrate thus obtained contained some of the cesium impurity present in the impure starting material. In order to separate the rubidium from the cesium, the rubidium nitrate was converted to a chloride solution by boiling the rubidium nitrate in a large excess of concentrated hydrochloric acid. This excess of hydrochloric acid was used to ensure conversion of all of the rubidium nitrate to rubidium chloride. The chloride solution was then concentrated by boiling until a crop of rubidium chloride began to crystallize in the boiling solution. The solution was cooled to room temperature to precipitate rubidium chloride crystals from solution and the rubidium chloride crystals were separated from the solution by filtration. Examination of this product by flame photometry confirmed that a considerable amount of cesium had been removed. The rubidium chloride was then recrystallized by dissolving the rubidium chloride in water, concentrating the aqueous solution by boiling and cooling the concentrated solution to crystallize rubidium chloride out of the aqueous solution. The rubidium chloride recrystallizations were continued until no apparent improvement (cesium-wise) resulted on the fifth recrystallization. The final solution of the fifth crop was evaporated to dryness on a hot plate and heated overnight at 600° C. The resultant rubidium chloride contained less than 10 p.p.m. of cesium or potassium and less than 17 p.p.m. total detectable metallic impurities. This clearly shows that rubidium may be separated from a mixture of rubidium and cesium by the process of this invention.

Analysis of the salt for alkali impurities was done by flame photometry, using the standard addition method and correcting for background radiation at wave lengths adjacent to the peaks of the individual elements.

In addition to the flame determinations mentioned, a semi-quantitative spectrographic analysis was made. The salt was then analyzed, using sensitive wet chemical tests, for every element reported by the spectrograph. The rubidium chloride obtained had the following analysis:

Analysis of high-purity rubidium chloride

| | Percent |
|---|---|
| Sulfate solids as RbCl | 99.977 |
| Gravimetric chloride as RbCl | 99.97 |
| $Cs^+$ | 0.0006 |
| $K^+$ | 0.0004 |
| $Na^+$ | 0.00001 |
| $Li^+$ | 0.00003 |
| Iron | [1] 0.00001 |
| $Ca^{++}$ and $Mg^{++}$ | [2] 0.0003 |
| Wt. loss at 400° C. for two hours | 0.0040 |
| $No_3^-$ | [3] 0.0001 |
| Silicon | [4] 0.0002 |

[1] Colorimetric determination, with bathophenanthroline.
[2] By Versene titration.
[3] Colorimetric determination with phenol disulfonic acid.
[4] Colorimetric determination, molybdenum-blue method.

This example clearly shows that the present invention is effective in separating alkali metal impurities from rubidium and in preparing a rubidium salt of high purity.

It will be understood that any of a number of other impure salts of rubidium can be used as starting material instead of the technical-grade carbonate utilized in the preceding example. For example, the contamination of technical-grade RbOH (5% contaminants) or $RbNO_3$ (5% contaminants) or any of the other materials described hereinabove can be lowered to below about 20 p.p.m. total detectable metallic impurities by the above described procedure.

While the invention has been described with respect to what at present are believed to be preferred embodiments thereof it will be understood, of course, that certain changes and modifications may be made therein without departing from the scope of the invention as defined in the appended claims.

What is claimed is:

1. A process for separating rubidium values from a mixture of rubidium and at least one impurity selected from the group consisting of lithium, sodium, potassium and cesium which comprises
converting said mixture to a solution in which the rubidium and said impurity are present as nitrates,
evaporating said solution to increase the concentration thereof and
precipitating crystals comprising rubidium nitrate separate from the major portion of said impurity which remains in said solution.

2. The process defined in claim 1 in which said nitrate solution is formed by acidifying the mixture with nitric acid.

3. The process defined in claim 1 in which said nitrate solution is concentrated by heating the solution until rubidium nitrate crystals begin to form in said solution and then cooling the solution to precipitate crystals comprising rubidium nitrate from the concentrated solution.

4. The process defined in claim 1 in which said crysalts comprising rubidium nitrate are recrystallized by contacting said crystals with water to form an aqueous solution thereof, evaporating said solution to increase the concentration thereof and crystallizing rubidium nitrate crystals from said concentrated aqueous solution.

5. The process defined in claim 4 in which said recrystallization of the rubidium nitrate is repeated until the rubidium nitrate crystals are substantially free of impurities selected from the group consisting of lithium, sodium and potassium, and recovering said rubidium nitrate crystals.

6. The process defined in claim 5 in which said recovered rubidium nitrate crystals, containing a portion of the cesium impurity contained in said mixture, are treated to separate rubidium values from said cesium impurity.

7. The process defined in claim 6 in which said rubidium values are separated from said cesium impurity by
converting said crystals to a chloride solution in which the rubidium and the cesium impurity are present as chlorides,
evaporating said solution to increase the concentration thereof, and
precipitating crystals of rubidium chloride separate from the cesium impurity which remains in said chloride solution.

8. The process defined in claim 7 in which said chloride solution is formed by heating said crystals in hydrochloric acid.

9. The process defined in claim 7 in which said chloride solution is concentrated by heating the solution until rubidium chloride crystals begin to form in said solution and then cooling the solution to precipitate rubidium chloride in crystalline form.

10. The process defined in claim 7 in which said rubidum chloride is recrystallized by contacting said rubidium chloride crystals with water to form an aqueous solution thereof, heating said solution to increase the concentration thereof and crystallizing rubidium chloride from said concentrated aqueous solution.

11. The process defined in claim 10 in which said recrystallization is repeated until the rubidium chloride crystals contain less than about 10 p.p.m. cesium.

References Cited
FOREIGN PATENTS 872,509   7/1961   Great Britain.

OTHER REFERENCES

J. W. Mellor's "A Comprehensive Treatise on Inorganic and Theoretical Chemistry," vol. 2, 1922 Ed., p. 540, Longmans, Green & Co., New York.

Supplement to Mellor's "A Comprehensive Treatise on Inorganic and Theoretical Chemistry," vol. II, Supp. III, Part 2 (1963 Ed.), pp. 2196, 2197, 2199, 2202 and 2203, John Wiley & Sons, Inc., New York.

EDWARD STERN, Primary Examiner

U.S. Cl. X.R.

23—102